United States Patent
Zhang et al.

(10) Patent No.: US 10,151,965 B2
(45) Date of Patent: Dec. 11, 2018

(54) MOTOR, GIMBAL, AND UNMANNED AERIAL VEHICLE

(71) Applicant: AUTEL ROBOTICS CO., LTD., Shenzhen, Guangdong (CN)

(72) Inventors: Zhengli Zhang, Guangdong (CN); Songtao Chang, Guangdong (CN); Zhuanpeng Cheng, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/692,441

(22) Filed: Aug. 31, 2017

(65) Prior Publication Data

US 2018/0246394 A1 Aug. 30, 2018

Related U.S. Application Data

(63) Continuation of application No. PCT/CN2017/080457, filed on Apr. 13, 2017.

(30) Foreign Application Priority Data

Feb. 27, 2017 (CN) .......................... 2017 1 0109150

(51) Int. Cl.
  *G03B 15/00* (2006.01)
  *B64D 47/08* (2006.01)
  (Continued)

(52) U.S. Cl.
  CPC .......... *G03B 15/006* (2013.01); *B64D 47/08* (2013.01); *H04N 5/2252* (2013.01);
  (Continued)

(58) Field of Classification Search
  CPC .................................................. G03B 15/006
  See application file for complete search history.

(56) References Cited

U.S. PATENT DOCUMENTS

| | | | |
|---|---|---|---|
| 5,502,598 A * | 3/1996 | Kimura | G02B 7/023 |
| | | | 348/E5.028 |
| 9,798,157 B2 * | 10/2017 | Yasuda | G02B 7/023 |
| (Continued) | | | |

FOREIGN PATENT DOCUMENTS

| | | |
|---|---|---|
| CN | 201383721 Y | 1/2010 |
| CN | 105897218 A | 8/2016 |
| CN | 106451848 A | 2/2017 |

*Primary Examiner* — Clayton E. LaBalle
*Assistant Examiner* — Dennis Hancock
(74) *Attorney, Agent, or Firm* — Ladas & Parry LLP

(57) ABSTRACT

This application relates to the field of aerial vehicle technologies, and provides a motor, a gimbal, and an unmanned aerial vehicle. The motor includes: a first and a second connection terminals, where the first connection terminal includes a circuit board including a coil circuit; the second connection terminal includes a permanent magnet adjacent to the coil circuit, wherein there is a gap between the permanent magnet and the coil circuit, and the permanent magnet has an axial magnetization structure; one of the first and the second connection terminals is fixedly connected to a lens module and sleeved over the lens module, and the other is movably connected to the lens module and sleeved over the lens module. In the foregoing manner, the overall size and weight of the motor are greatly reduced, and therefore, the motor has the advantages of a compact structure, a small size, and a light weight.

28 Claims, 7 Drawing Sheets

(51) Int. Cl.
*H04N 5/225* (2006.01)
*G02B 27/64* (2006.01)

(52) U.S. Cl.
CPC .. *B64C 2201/123* (2013.01); *B64C 2201/127* (2013.01); *G02B 27/644* (2013.01)

(56) References Cited

U.S. PATENT DOCUMENTS

| | | | |
|---|---|---|---|
| 2002/0167237 A1 | 11/2002 | Horng et al. | |
| 2006/0033818 A1* | 2/2006 | Wada | G03B 17/00 348/208.11 |
| 2007/0200445 A1* | 8/2007 | Yamagiwa | H02K 7/14 310/156.32 |
| 2007/0290582 A1* | 12/2007 | Han | H02K 1/06 310/68 R |
| 2010/0166402 A1* | 7/2010 | Lee | G02B 7/021 396/72 |
| 2010/0182696 A1* | 7/2010 | Hasegawa | G02B 27/646 359/557 |
| 2013/0223829 A1* | 8/2013 | Nakayama | H02K 5/04 396/55 |
| 2015/0002683 A1* | 1/2015 | Hu | H04N 5/2328 348/208.2 |
| 2017/0336018 A1* | 11/2017 | Xie | F16M 11/18 |

* cited by examiner

MOTOR, GIMBAL, AND UNMANNED AERIAL VEHICLE

CROSS-REFERENCE

This application is a continuation application of International Application No. PCT/CN2017/080457, filed Apr. 13, 2017, which claims priority of Chinese Patent Application No. 201710109150X, filed Feb. 27, 2017, which is incorporated herein by reference in its entirety.

BACKGROUND

Technical Field

This application relates to the field of aerial vehicle technologies, and in particular, to a motor, a gimbal equipped with the motor, and an unmarried aerial vehicle equipped with the gimbal.

Related Art

A gimbal is a support device for mounting and fixing a camera. It is classified into two types: a fixed gimbal and a motor-driven gimbal. The fixed gimbal is applicable to a relatively small monitoring area. After a camera is mounted on the fixed gimbal, a horizontal angle and a pitch angle of the camera may be adjusted. After the camera reaches an optimal working angle, it is only needed to lock a mechanism for adjusting angles of the camera. The motor-driven gimbal is applicable to scanning and monitoring of a large area. It can expand a monitoring area of a camera.

An existing aerial photography unmanned aerial vehicle is equipped with one or more gimbals. A lens is provided on the gimbal and generally has a view angle within 180 degrees. When a 360-degree panorama image needs to be captured, a motor provided on the gimbal needs to provide power to cause the lens to rotate, or multiple gimbals need to be used in coordination for photographing at different view angles.

In the process of implementing this application, the inventor finds that the related technologies have the following problems: When an existing motor is used on a gimbal, limited by a mechanism of the motor, the gimbal has a large size, a heavy weight, high costs, and a complex structure. Consequently, it is quite difficult to reduce the overall size and weight of an unmanned aerial vehicle and the gimbal, making it difficult to design a lightweight, miniature, and compact unmanned aerial vehicle.

SUMMARY

To resolve the foregoing technical problems, embodiments of this application provide a motor with a compact structure, a gimbal equipped with the motor, and an unmanned aerial vehicle equipped with the gimbal.

To resolve the foregoing technical problems, an embodiment of this application provides a motor, including: a first connection terminal, including a circuit board, where the circuit board includes a coil circuit; and a second connection terminal, including a permanent magnet, where the permanent magnet is adjacent to the coil circuit, wherein there is a gap between the permanent magnet and the coil circuit, and the permanent magnet has an axial magnetization structure, where one of the first connection terminal and the second connection terminal is fixedly connected to a lens module and sleeved over the lens module, and the other of the first connection terminal and the second connection terminal is movably connected to the lens module and sleeved over the lens module.

Further, the terminal that is movably connected to the lens module of the first connection terminal and the second connection terminal is a stator of the motor, and the stator is movably connected to the lens module by using a bearing.

Further, the bearing is embedded in the stator, and the lens module is embedded in the bearing.

Further, the circuit board further includes a substrate and a power circuit disposed on the substrate, where the power circuit is electrically connected to the coil circuit.

Further, the circuit board further includes a detection circuit disposed on the substrate, where the terminal that is fixedly connected to the lens module of the first connection terminal and the second connection terminal is a rotator of the motor, and the detection circuit is configured to detect a leakage magnetic field of the permanent magnet on the second connection terminal, so as to feed back positional information of the rotator.

Further, the circuit board further includes a drive and control chip, where the drive and control chip is separately electrically connected to the power circuit and the detection circuit, and the drive and control chip is configured to control the power circuit according to the positional information of the rotator fed back by the detection circuit.

Further, the coil circuit includes a single layer or multiple layers of linear circuits disposed in radial directions of the motor.

Further, the first connection terminal or the second connection terminal is sleeved over the lens module at any of the following positions: a lens of the lens module, a lens base of the lens module, or a connecting component between the lens and the lens base.

Further, the lens module includes at least one lens.

Further, the lens module includes two lenses.

To resolve the foregoing technical problems, an embodiment of this application further provides a gimbal, including:

a lens module; a first-axis motor assembly driving the lens module to rotate, where the first-axis motor assembly includes a motor; and a housing, where the housing accommodates the lens module and the first-axis motor assembly.

Further, the motor includes a first connection terminal and a second connection terminal, a terminal that is movably connected to the lens module of the first connection terminal and the second connection terminal is a stator of the motor, and the stator of the motor is fixedly connected to the housing.

Further, one end of the stator of the motor is fixedly connected to one side of the housing.

Further, another end of the stator of the motor is fixedly connected to another side of the housing.

Further, the entire outer edge of the stator of the motor is fixedly connected to the inner side of the housing. Further, the stator of the motor is fixedly connected to the housing by using a connecting piece.

Further, when the entire outer edge of the stator of the motor is fixedly connected to the inner side of the housing, the connecting piece is in an annular shape.

In some implementations, the number of the motor is one, and the lens module includes one lens; and a rotator of the motor is fixedly connected to the lens, and one end of the motor that is fixedly connected to the lens module is the rotator of the motor.

In some implementations, the number of the motor is one, and the lens module includes a first lens and a second lens;

and a rotator of the motor is fixedly connected to the first lens and the second lens, and one end of the motor that is fixedly connected to the lens module is the rotator of the motor.

In some implementations, the motor includes a first motor and a second motor, and the lens module includes a first lens and a second lens; a rotator of the first motor is fixedly connected to the first lens, a stator of the first motor is fixedly connected to the housing, and one end of the first motor that is movably connected to the first lens is the stator of the first motor; and a rotator of the second motor is fixedly connected to the second lens, a stator of the second motor is fixedly connected to the housing, and one end of the second motor that is movably connected to the second lens is the stator of the second motor.

Further, one end of the stator of the first motor and one end of the stator of the second motor are fixedly connected to a same side of the housing.

In some implementations, another end of the stator of the first motor and another end of the stator of the second motor are fixedly connected to another side of the housing.

In some implementations, the another end of the stator of the first motor and the another end of the stator of the second motor are fixedly connected to each other.

In some implementations, the entire outer edge of the stator of the first motor and the entire outer edge of the stator of the second motor are separately fixedly connected to the inner side of the housing. Further, the stator of the first motor and the stator of the second motor are separately fixedly connected to the housing by using the connecting piece.

Further, when the entire outer edge of the stator of the first motor and the entire outer edge of the stator of the second motor are separately fixedly connected to the inner side of the housing, the connecting piece is in an annular shape.

Further, the housing further includes a filter glass, and the lens in the lens module captures light through the filter glass.

Further, the housing is spherical.

Further, the first-axis motor assembly is a roll-axis motor assembly, the motor in the first-axis motor assembly is a roll-axis motor, and the roll-axis motor drives the lens module to rotate around a roll axis.

Further, the gimbal further includes: a support; and a pitch-axis motor, where a stator of the pitch-axis motor is fixedly connected to the support, and a rotator of the pitch-axis motor is fixedly connected to the housing.

Further, the support includes a cross arm and a first support arm, one end of the first support arm is fixedly connected to the cross arm, and the other end of the first support arm is fixedly connected to the stator of the pitch-axis motor.

Further, the first support arm is in a circular arc shape or in an L shape.

Further, the support further includes a second support arm, one end of the second support arm is fixedly connected to one end of the cross arm away from the first support arm, and the other end of the second support arm is movably connected to the housing.

Further, the support is in a U shape.

Further, the gimbal further includes a yaw-axis motor, where a rotator of the yaw-axis motor is fixedly connected to the support.

Further, the motor in the first-axis motor assembly is the motor as described above.

To resolve the foregoing technical problems, an embodiment of this application further provides an unmanned aerial vehicle, including a vehicle body and the gimbal as described above, and the gimbal is mounted on the vehicle body.

This application has the following beneficial effects: Compared with the prior art, the embodiments of this application fully take the advantages of a stator and a rotator of an axial-magnetic-field motor of greater flexibility in changes of size design and easier implementation of product manufacturing than a stator and a rotator of a conventional radial-magnetic-field motor, the size of the axial-magnetic-field motor, especially the sizes of the stator and the rotator, is designed according to the size of a lens module, and thereby a rotational shaft of the axial-magnetic-field motor is replaced with the lens module, so that a stator and a rotator of a motor of a motor assembly in at least one axis are sleeved over the lens module, greatly reducing the overall size and weight of the motor, and thereby bringing the advantages of a compact structure, a small size, and a light weight to the motor.

Further, the motor and the lens module are both accommodated inside a housing, greatly reducing the overall size and weight of a gimbal, and thereby bringing the advantages of a compact structure, a small size, and a light weight to the whole gimbal equipped with the motor.

Moreover, when operating, the motor assembly in this axis drives only the lens module to rotate. Compared with the situation in which when a motor assembly in any axis in a conventional gimbal operates, the motor assembly needs to drive both a lens module and a housing accommodating the lens module to rotate together, an energy consumption requirement is decreased, thereby decreasing a requirement on power of the motor assembly, further conducing to reducing the size and weight of the motor assembly, and finally enabling the gimbal to have a smaller size and a lighter weight, and therefore satisfying the requirement for a lightweight, miniature, and compact unmanned aerial vehicle.

BRIEF DESCRIPTION OF THE DRAWINGS

One or more embodiments are exemplarily described by using corresponding figures in the accompanying drawings. These exemplary descriptions do not constitute any limitation to the embodiments. Elements with a same reference numeral in the accompanying drawings represent similar elements. Unless specially stated, the figures in the accompanying drawings are not necessarily drawn to scale.

DETAILED DESCRIPTION

Figure 1:
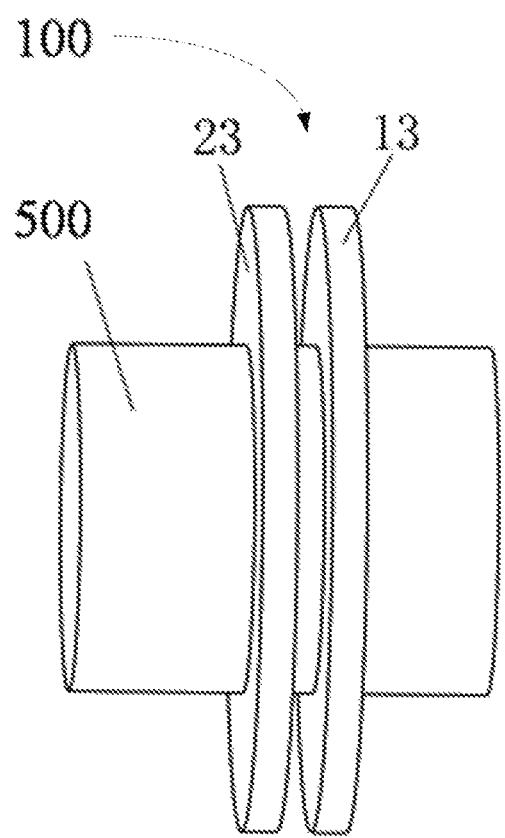
FIG. 1 is a schematic view of a connection relationship between a simplified first connection terminal and a simplified second connection terminal of a motor according to Embodiment 1 of this application, and a simplified lens module.

For ease of understanding of this application, this application is described below in further detail with reference to the accompanying drawings and specific implementations. It should be noted that, when an element is described as "being fixed on" on another element, the element may be directly on the another element, or there may be one or more intermediate elements therebetween. When an element is described as "being connected to" another element, the element may be directly connected to the another element, or there may be one or more intermediate elements therebetween. Orientational or positional relationships indicated by the terms "above", "below", "inside", "outside", "bottom", and the like used in this specification are orientational or positional relationships shown based on the accompanying drawings, and are merely for purpose of describing this application and simplifying description, rather than indicating or implying that indicated apparatuses or elements need to have specific orientations or constructed or operated in specific orientations, and therefore should not be interpreted as limitations to this application. In addition, the terms "first", "second", "third", and the like are merely used for purpose of description, and should not be interpreted as indicating or implying relative importance.

Unless otherwise defined, all the technical and scientific terms used in this specification have same meanings as those commonly understood by a person skilled in the art of this application. In this specification, the terms used in this specification of this application are merely intended for purpose of describing specific implementations, rather than limiting this application. The term "and/or" used in this specification includes any combination and all combinations of one or more listed relevant items.

In addition, the technical features involved in different implementations of this application described below can be combined with each other provided that the technical features do not conflict with each other.

A first connection terminal in the embodiments of this application includes a circuit board, and the circuit board includes a coil circuit. A second connection terminal includes a permanent magnet. The permanent magnet is adjacent to the coil circuit, wherein there is a gap between the permanent magnet and the coil circuit, and the permanent magnet has an axial magnetization structure.

One of the first connection terminal and the second connection terminal is fixedly connected to a lens module and sleeved over the lens module, and the other of the first connection terminal and the second connection terminal is movably connected to the lens module and sleeved over the lens module. The terminal fixedly connected to the lens module is a rotator of the motor, and the terminal movably connected to the lens module is a stator of the motor.

It should be noted that the "stator" and the "rotator" of the motor are relative concepts. Generally, the second connection terminal is fixedly connected to the lens module 510 that is to be driven by the second connection terminal to rotate. In this case, the second connection terminal is referred to as the rotator. The first connection terminal is fixedly connected to an external apparatus such as a housing 520, and the first connection terminal does not rotate with the lens module 510. In this case, the first connection terminal is referred to as the stator. However, in a special case, the first connection terminal and the second connection terminal may be implemented in an opposite manner. That is, the first connection terminal is fixedly connected to the lens module 510, and the first connection terminal drives the lens module 510 to rotate. In this case, the first connection terminal is referred to as the rotator. The second connection terminal is fixedly connected to an external apparatus such as the housing 520, and the second connection terminal does not rotate with the lens module 510. In this case, the second connection terminal is referred to as the stator.

To avoid repetition, only the case in which the second connection terminal is fixedly connected to the lens module 510 and sleeved over the lens module 510 is described in the embodiments below. In this case, the second connection terminal is used as the rotator of the motor, and the first connection terminal is used as the stator of the motor. It can be understood by a person of ordinary skill in the art that the case in which the first connection terminal is fixedly connected to the lens module 510 is similar to the foregoing case, and details are not described herein again.

In addition, the "first axis" in this specification is a relative concept. For example, when a placing position changes, the optical axis of a lens of the lens module may or may not coincide with the first axis of the lens module. The case in which the first axis of the lens module coincides with the optical axis of the lens is described below. A first-axis motor assembly in this case is a roll-axis motor assembly that drives the lens on the lens module to perform a roll action. It should be understood that in different embodiments, a motor of the first-axis motor assembly may also be a pitch-axis motor that drives the lens module to perform a pitch action, or a yaw-axis motor that drives the lens module to perform a yaw action.

Optionally, the first axis may be a roll axis, a pitch axis, or a yaw axis of a gimbal.

It should be understood that the lens module further includes a second axis and a third axis, and the first axis, the second axis, and the third axis are perpendicular to each other. For example, when multiple gimbals and lens modules are provided on an unmanned aerial vehicle in a surrounding manner, a first axis of any of the lens modules may form an arbitrary angle, for example, 0 degrees, 60 degrees, or 120 degrees, with a roll axis of the unmanned aerial vehicle.

Embodiment 1

Referring to FIG. 1 to FIG. 5, FIG. 1 to FIG. 5 show a motor 100 according to this embodiment of this application. The motor 100 includes a first connection terminal and a second connection terminal. The first connection terminal includes a circuit board 13, and the circuit board 13 includes a coil circuit. The second connection terminal includes a permanent magnet 23. The permanent magnet 23 is adjacent to the coil circuit of the circuit board 13, wherein there is a gap between the permanent magnet 23 and the coil circuit, and the permanent magnet 23 has an axial magnetization structure. An example in which the second connection terminal is used as a rotator of the motor is used for description in this embodiment of this application. The second connection terminal as the rotator is fixedly connected to a lens module 500 and sleeved over the lens module 500, and the rotator rotates to drive the lens module 500 to rotate. The first connection terminal as the stator is movably connected to the lens module 500 and sleeved over the lens module 500.

Figure 7:
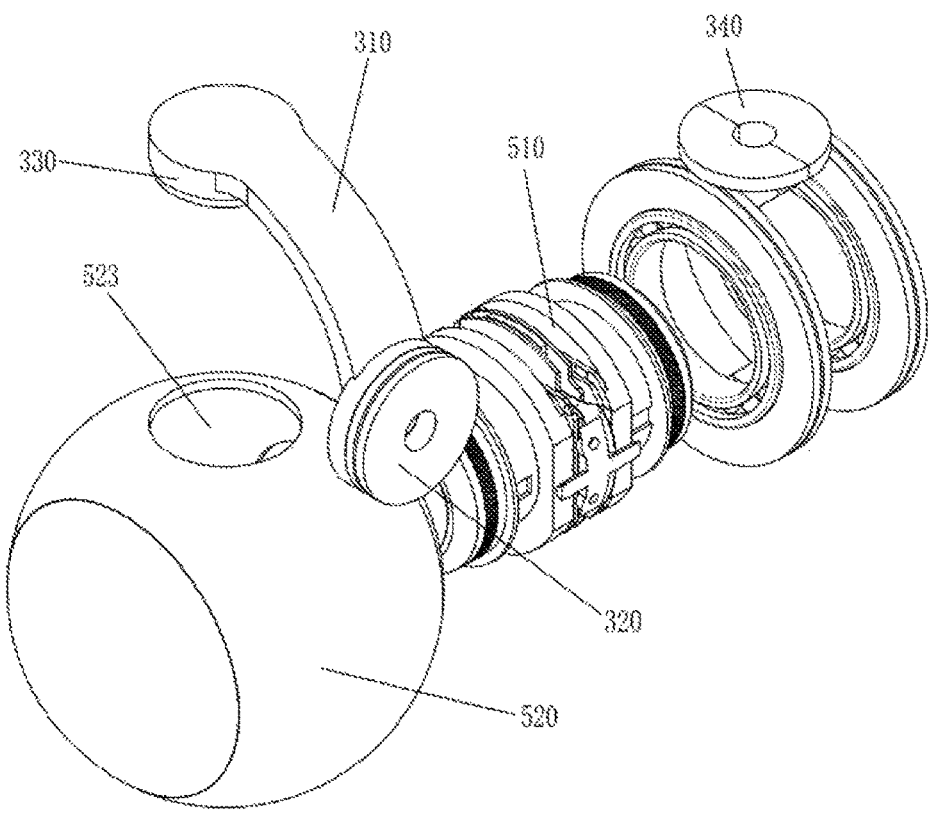
FIG. 7 is a schematic exploded view of the gimbal according to Embodiment 2 of this application.

A person skilled in the art can understand the meaning of the term "ring" with reference to FIG. 7. The "lens module" referred to in this embodiment of this application is an imaging apparatus of a gimbal. As shown in FIG. 7, the lens module 510 is substantially cylindrical, and a first-axis motor assembly 340 is substantially annular and has a hollow structure. The lens module 510 passes through the first-axis motor assembly 340, and is embedded on an internal wall of the hollow structure of the first-axis motor assembly 340.

The first-axis motor assembly 340 may be applied to the gimbal, to drive the lens module 510 to rotate sound a roll axis.

In this embodiment, the case in which the second connection terminal is fixedly connected to the lens module 500 and sleeved over the lens module 500 is described. Therefore, for ease of description and understanding, the second connection terminal is briefly referred to as a rotator and the first connection terminal as a stator below. It should be understood that, when this embodiment is implemented in an opposite manner, the rotator described in this specification indicates the first connection terminal, and the stator indicates the second connection terminal.

The rotator is fixedly connected to the lens module 500. In some implementations, the rotator may be fixedly connected to the lens module 500 by using a fastening device (for example, a screw or an adhesive). In some other implementations, the rotator may also be fixedly connected to the lens module 500 by using a support piece. The support piece is placed in parallel to the rotator. In some implementations, the cross section of the support piece perpendicular to the lens module 500 may be annular. In some implementations, the support piece having the annular section may also not be used, and a support piece in any other shape such as a cylindrical, cubic, or striped shape may be used instead. By providing the support piece, not only the rotator can be reinforced, but also rotation of the lens module 500 driven by the rotator can be more stable.

The stator is movably connected to the lens module 500 and sleeved over the lens module 500. In some implementations, the stator may be directly sleeved over the lens module 500, and forms a movable connection to the lens module 500 allowing the stator and the lens module 500 to slide relative to each other. The stator may also be indirectly sleeved over the lens module 500 in any manner well known by a person skilled in the art to form a movable connection to the lens module 500. For example, in some implementations, the stator is movably connected to the lens module 500 by using a bearing. The bearing is embedded in the stator, and the lens module 500 is embedded in the bearing. Any implementation can be used, provided that the inner diameter of the stator is greater than the outer diameter of the lens module 500 so that the stator does not rotate with the lens module 500 when the lens module 500 rotates.

In addition, the rotator may further include an auxiliary inductive magnet (not shown in the figures). The auxiliary inductive magnet is annular, and is fixedly connected to the lens module 500 and sleeved over the lens module 500. A main magnetic field of the auxiliary inductive magnet may be axial, or may be radial.

Figure 2:
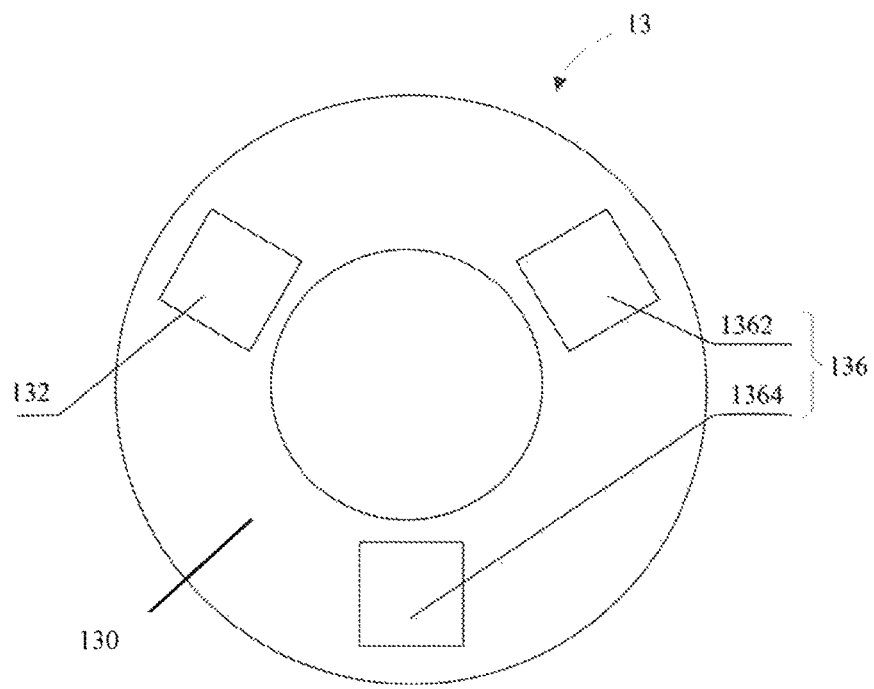
FIG. 2 is a front view of a circuit board of the motor according to Embodiment 1 of this application.
Figure 3:
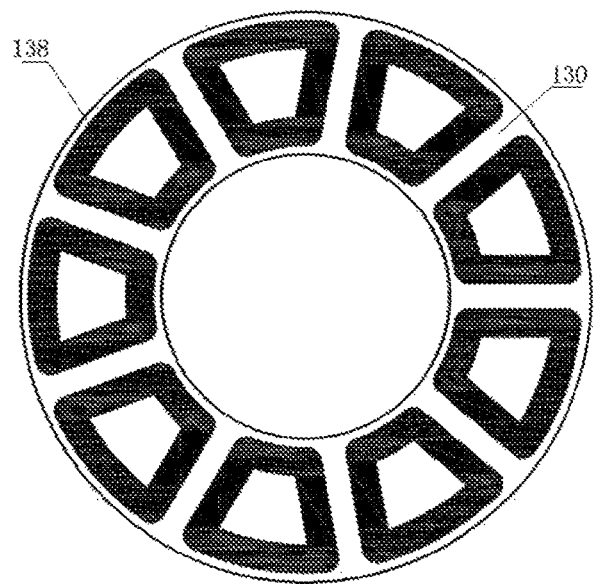
FIG. 3 is a rear view of the circuit board of the motor according to Embodiment 1 of this application.
Figure 4:
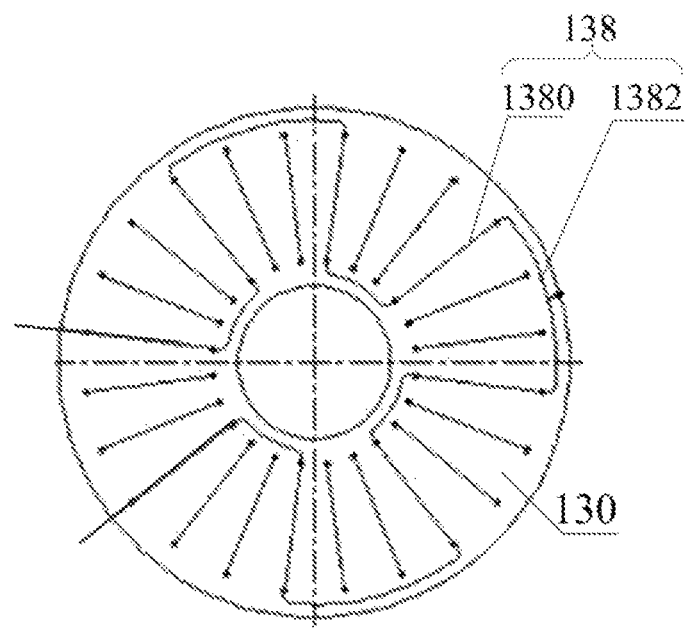
FIG. 4 is a schematic view of a circuit structure of a coil circuit of the circuit board according to Embodiment 1 of this application.

Referring to FIG. 2 to FIG. 4, the foregoing circuit board 13 is a printed circuit board, and includes a substrate 130, a detection circuit 132, a drive and control circuit 136, and the coil circuit 138.

The foregoing detection circuit 132 is disposed on the substrate 130, and the detection circuit 132 detects a leakage magnetic field of the permanent magnet 23, so as to feed back positional information such as a rotational position and an angle of the rotator to a drive and control chip 1362. The drive and control chip 1362 adjusts a power output of the power circuit 1364 according to the positional information of the rotator fed back by the detection circuit 132, to control the power circuit 1364.

It should be understood that, in Embodiment 1, the first connection terminal including the circuit board 13 is used as the stator. In this case, the detection circuit 132 on the circuit board 13 feeds back the positional information of the rotator by detecting the leakage magnetic field of the permanent magnet 23 on the second connection terminal used as the rotator. In some implementations, when the first connection terminal including the circuit board 13 is fixedly connected to the lens module 500 to be used as the rotator, the detection circuit 132 on the circuit board 13 feeds back the positional information of the rotator, that is, the first connection terminal itself, by detecting the leakage magnetic field of the permanent magnet 23 on the second connection terminal used as the stator.

In some implementations, the detection circuit 132 may include a magnetic encoding device, disposed on one surface of the substrate 130 and facing the auxiliary inductive magnet. The magnetic encoding device senses the main magnetic field of the auxiliary inductive magnet assembled on the rotator, and outputs a corresponding analog voltage signal, to feed back the positional information, for example, an angle and a rotational position, of the rotator.

In some implementations, the detection circuit 132 may include a Hall element, disposed on the substrate 130 and facing one side of the permanent magnet 23. The Hall element senses the leakage magnetic field of the permanent magnet 23 by virtue of the Hall effect, and outputs an analog/digital voltage signal, to feed back the positional information, for example, the rotational position and the angle, of the rotator to the drive and control chip 1362. The Hall element may be a linear Hall sensor or a switch-type Hall sensor. The drive and control chip 1362 adjusts the power output of the power circuit 1364 according to the fed-back positional information of the rotator, to control the power circuit 1364.

The foregoing drive and control circuit 136 includes the drive and control chip 1362 and the power circuit 1364, both of which are disposed on the substrate 130. The power circuit 1364 is electrically connected to the coil circuit 138, to supply power to the coil circuit 138. The drive and control chip 1362 is separately electrically connected to the power circuit 1364 and the detection circuit 132. The drive and control chip 1362 triggers, according to the positional information of the rotator fed back by the detection circuit 132, a corresponding electronic switch element to be switched on or switched off, to adjust the power output of the power circuit 1364. The drive and control chip 1362 controls the power circuit 1364 by adjusting the power output of the power circuit 1364.

In an implementation, there is one circuit board 13 and one permanent magnet 23, the permanent magnet 23 is adjacent to the coil circuit of the circuit board 13, and wherein there is a gap between the permanent magnet 23 and the coil circuit. The permanent magnet 23 has an axial magnetization structure. The permanent magnet 23 has a Halbach-matrix axial magnetization structure. The permanent magnet 23 may be a whole structure, or may be multiple magnets arranged as a Halbach matrix. The permanent magnet 23 provides an axial magnetic field for the coil circuit 138 of the circuit board 13.

In some implementations, there is one circuit board 13 and two permanent magnets 23, the circuit board 13 is disposed between the two permanent magnets 23, and wherein there is a gap between the two permanent magnets 23. The permanent magnets 23 have axial magnetization structures. Each permanent magnet 23 may be a whole structure for Halbach axial magnetization, or may be a scattered structure formed by magnets arranged as a Halbach matrix. By disposing the two permanent magnets 23 on two sides of the circuit board 13, the magnetic flux of the motor can be enhanced, the operation efficiency can be improved, and therefore, the power of the motor can be increased. For some application scenarios in which there is a special shape/interface, the advantages of strong power and high efficiency can be taken.

In some implementations, there are two circuit boards 13 and one permanent magnet 23, the permanent magnet 23 is disposed between the circuit boards 13, and wherein there is a gap between the two circuit boards 13. The permanent magnet 23 has a two-side axial magnetization structure. The permanent magnet 23 has a Halbach axial magnetization structure, and may be a whole structure for Halbach axial magnetization, or may be a scattered structure formed by magnets arranged as a Halbach matrix. The two circuit boards 13 are disposed on two sides of the permanent magnet 23. By increasing the quantity of windings of inductive coils based on two-side magnetization of the permanent magnet 23, an output power can be increased, and operation efficiency can be improved. For some application scenarios in which there is a special shape/interface, the advantages of strong power and high efficiency can be taken.

In some implementations, there are three circuit boards 13, there are two permanent magnets 23, the two permanent magnets 23 are respectively located in two gaps formed by the three circuit boards 13, and there are gaps between each permanent magnet 23 and two circuit boards 13 adjacent to the permanent magnet 23. The two permanent magnets 23 both have a two-side axial magnetization structure. The permanent magnets 23 have Halbach axial magnetization structures, and may be whole structures for Halbach axial magnetization, or may be scattered structures formed by magnets arranged as Halbach matrices.

It can be understood by a person skilled in the art that the permanent magnet 23 may also have a single-side magnetization structure.

Figure 5:
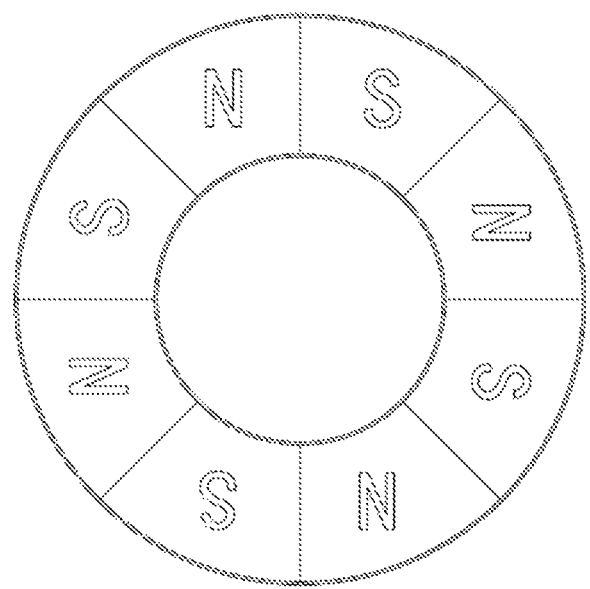
FIG. 5 is a schematic structural view of a permanent magnet according to Embodiment 1 of this application.

It should be noted that, in the foregoing implementations, the axial magnetization structure of the permanent magnet 23 is not limited to the Halbach matrix structure, and when there are multiple magnets, the quantity of the magnets is also not limited to the quantity shown in FIG. 5.

In this embodiment of this application, the magnetic field action direction of the permanent magnet 23 is designed as axial main magnetic flux, and the permanent magnet 23 and the circuit board 13 are such designed that ends thereof interface with a gap therebetween, thereby removing an ineffective end winding for electromagnetic reaction, greatly decreasing an axial size, reducing quality and size, and increasing power density; reducing rotational inertia of the rotator, winding inductance, and an electromagnetic time constant, and effectively improving dynamic performance; and opening heat conduction space, and enhancing heat dissipation performance.

In addition, the circuit board 13 in this embodiment of this application is a carrier of the coil circuit 138. Replacing a conventional iron core, the coil circuit 138 is printed on the circuit board 13 by corrosion and copper pouring, thereby radiating the shortcomings of cogging torque, hysteresis, and eddy-current loss of an existing motor, weakening torque disturbance, and improving operation efficiency.

As shown in FIG. 4, a single layer or multiple layers of radial linear circuits 1380 may be embedded into the circuit board 13 by corrosion and copper pouring, and the radial linear circuits 1380 are then sequentially connected in series by using arc circuits 1382, forming one-phase windings equivalent to those of a general motor; heads and tails of the windings are then connected to each other by using the arc circuits 1382, for example, by using a star connection or a triangle connection, to form the coil circuit 138 of the motor 100, as shown in FIG. 3. Such a winding structure can reduce the weight of the rotator, greatly reduce the size of the rotator, and thereby decrease rotational inertia of the rotator. Therefore, the motor features a light weight and a small size compared with an existing motor.

In addition, in different implementations, the lens module 500 may include at least one lens, for example, may include two lenses.

It should be noted that the first connection terminal may also be fixedly connected to the lens module 500, and the second connection terminal may be movably connected to the lens module 500. In this case, the first connection terminal is used as the rotator of the motor, and the second connection terminal is used as the stator of the motor. For details, reference may be made to the description in this embodiment of this application.

It should be understood that FIG. 1 only shows a simplified lens module 500 in a cylindrical shape, to indicate that this embodiment of this application may have multiple different implementations. There is no special limitation to joint positions in which the stator and the rotator are sleeved over the lens module 500. The stator and the rotator may be sleeved over any or more components of the lens module 500, for example, sleeved over the lens or a lens base of the lens module 500, or sleeved over a connecting component between the lens and the lens base or any other component of the lens module 500. Different implementations can be implemented because the advantage of a stator and a rotator of an axial-magnetic-field motor of great flexibility in changes of size design is fully taken in this application. Therefore, the original sizes and shapes of components on a lens module may not be changed. Instead, the sizes of the stator and the rotator of the motor can be changed according to the sizes and shapes of the components, so as to design and manufacture the stator and the rotator of the motor with a size and shape suitable for sleeving over the lens module.

In this embodiment of this application, a stator and a rotator are sleeved over a lens. Compared with the prior art, in this embodiment of this application, by fully taking the advantages of a stator and a rotator of an axial-magnetic-field motor of greater flexibility in changes of size design and easier implementation of product manufacturing than a stator and a rotator of a conventional radial-magnetic-field motor, a rotational shaft of the axial-magnetic-field motor is replaced with the lens module, so that a stator and a rotator of a motor of a motor assembly in at least one axis are sleeved over the lens module, greatly reducing the overall size and weight of the motor, and thereby bringing the advantages of a compact structure, a small size, and a light weight to the motor.

Embodiment 2

This embodiment of this application provides a gimbal 300, as shown in FIG. 6 to FIG. 12. To focus on connection manners among a stator and a rotator of a motor and a lens module, in this embodiment, the stator and the rotator are both simplified to be annularly planar. It should be understood that, in other implementations, outer circumferential edges and hollow inner circumferential edges of the stator and the rotator may not be circular, but may be in any other shape.

Figure 6:
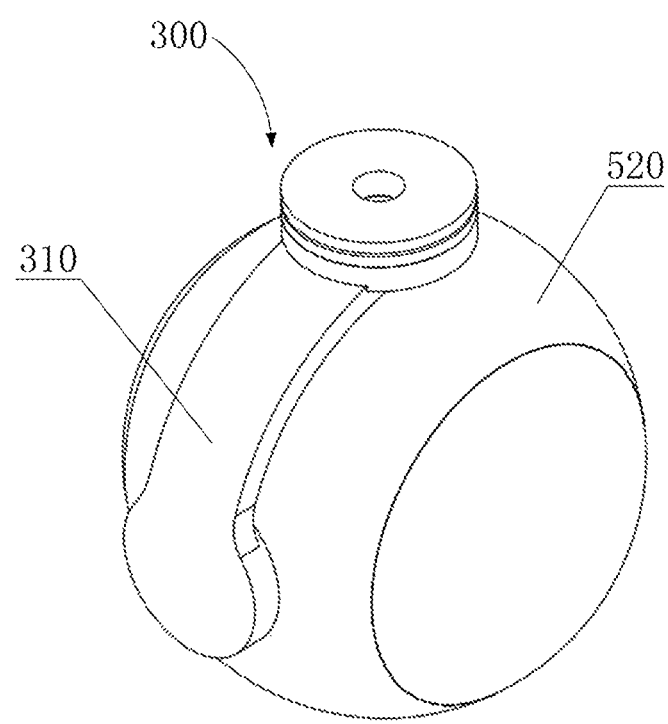
FIG. 6 is a three-dimensional view of a gimbal according to Embodiment 2 of this application.

As shown in FIG. 6 and FIG. 7, the gimbal 300 includes a lens module 510, a first-axis motor assembly 340 driving the lens module 510 to rotate, and a housing 520. The lens module 510 includes a lens, the first-axis motor assembly 340 includes a motor, and the housing 520 accommodates the lens module 510 and the first-axis motor assembly 340.

A motor of the first-axis motor assembly 340 includes a first connection terminal and a second connection terminal, a terminal that is movably connected to the lens module 510 of the first connection terminal and the second connection terminal is a stator of the motor, and the stator of the motor is fixedly connected to the housing 520.

In an implementation, one end of the stator of the motor is fixedly connected to one side of the housing 520. Preferably, another end of the stator of the motor is also fixedly connected to another side of the housing 520.

In another implementation, the entire outer edge of the stator of the motor is fixedly connected to the inner side of the housing 520.

Preferably, the stator of the motor is fixedly connected to the housing 520 by using a connecting piece. When the entire outer edge of the stator of the motor is fixedly connected to the inner side of the housing 520, the connecting piece is preferably in an annular shape.

The quantity of motors included in the first-axis motor assembly 340 and the quantity of lenses included in the lens module 510 are not limited in this embodiment of this application.

In an implementation, the number of the motor is one, and the lens module 510 includes one lens. In this case, the rotator of the motor is fixedly connected to the lens, and one end of the motor that is fixedly connected to the lens module 510 is the rotator of the motor.

In another implementation, the number of the motor is one, and the lens module 510 includes a first lens and a second lens. In this case, the rotator of the motor is fixedly connected to the first lens and the second lens, and one end of the motor that is fixedly connected to the lens module 510 is the rotator of the motor.

Figure 10:
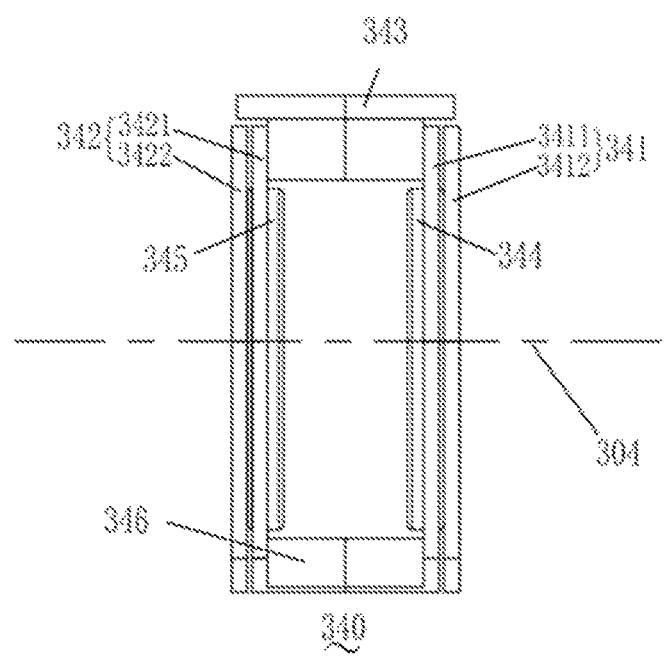
FIG. 10 is a side view of a first-axis motor assembly according to Embodiment 2 of this application.

In another implementation, as shown in FIG. 10, the first-axis motor assembly 340 includes two motors, that is, a first motor 341 and a second motor 342, and the lens module 510 includes two lenses, that is, a first lens 511 and a second lens 512. The first motor 341 includes a first motor stator 3411 and a first motor rotator 3412, and the second motor 342 includes a second motor stator 3421 and a second motor rotator 3422. The first motor rotator 3412 is fixedly connected to the first lens 511, the first motor stator 3411 is fixedly connected to the housing 520, and one end of the first motor 341 that is movably connected to the first lens 511 is the stator of the first motor 341. The second motor rotator 3422 is fixedly connected to the second lens 512, the second motor stator 3421 is fixedly connected to the housing 520, and one end of the second motor 342 that is movably connected to the second lens 512 is the stator of the second motor 342.

The first motor stator 3411 and the second motor stator 3421 are movably connected to the lens module 510 and sleeved over the lens module 510. In some implementations, the first motor stator 3411 and the second motor stator 3421 may be directly sleeved over the lens module 510, and form movable connections to the lens module 510 allowing the first motor stator 3411 and the second motor stator 3421 and the lens module 510 to slide relative to each other. In some other implementations, the first motor stator 3411 and the second motor stator 3421 may also be indirectly sleeved over the lens module 510 in any manner well known by a person skilled in the art to form movable connections to the lens module 510. For example, as shown in FIG. 10, the first motor stator 3411 and the second motor stator 3421 are movably connected to the lens module 510 by using a first bearing 344 and a second bearing 345 respectively. Specifically, the first bearing 344 and the second bearing 345 are respectively embedded in the first motor stator 3411 and the second motor stator 3421, and the lens module 500 is embedded in both the first bearing 344 and the second bearing 345. Any implementation can be used, provided that the inner diameter of the first motor stator 3411 and the inner diameter of the second motor stator 3421 are both greater than the outer diameter of the lens module 510 so that the first motor stator 3411 and the second motor stator 3421 do not rotate with the lens module 510 when the lens module 510 rotates.

In an implementation, one end of the first motor stator 3411 and one end of the second motor stator 3421 are fixedly connected to a same side of the housing 520. Preferably, another end of the first motor stator 3411 and another end of the second motor stator 3421 are fixedly connected to another side of the housing 520. Preferably, the another end of the first motor stator 3411 and the another end of the second motor stator 3421 are fixedly connected to each other.

In another implementation, the entire outer edge of the first motor stator 3411 and the entire outer edge of the second motor stator 3421 are separately fixedly connected to the inner side of the housing 520.

Preferably, the first motor stator 3411 and the second motor stator 3421 are separately fixedly connected to the housing 520 by using a connecting piece. When the entire outer edge of the first motor stator 3411 and the entire outer edge of the second motor stator 3421 are separately fixedly connected to the inner side of the housing 520, the connecting piece is preferably in an annular shape.

Preferably, the housing 520 further includes a filter glass, and the lens in the lens module 510 captures light through the filter glass.

Figure 8:
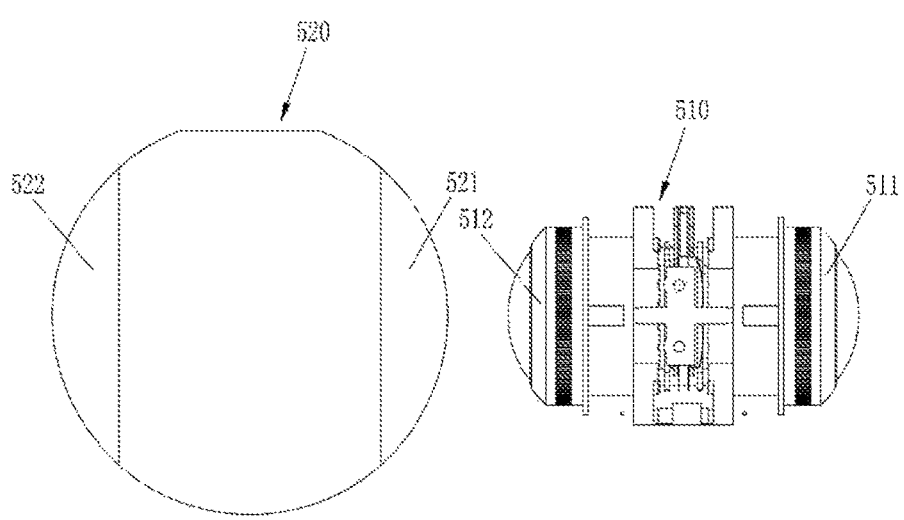
FIG. 8 is an exploded view of a housing and a lens module of the gimbal according to Embodiment 2 of this application.

Preferably, the filter glass is an ultraviolet (UV) filter glass. In this embodiment, the lens module 510 is provided with the first lens 511 and the second lens 512. In this case, as shown in FIG. 8, a first UV glass 521 and a second UV glass 522 are provided at two opposite ends of the housing 520. The first lens 511 and the second lens 512 respectively capture light through the first UV glass 521 and the second UV glass 522. The first UV glass 521 and the second UV glass 522 are both spherical, and the first UV glass 521 and the second UV glass 522 and the housing 520 together form a ball. The first UV glass 521 covers the first lens 511, and the optical axis of the first UV glass 521 coincides with the optical axis of the first lens 511. The second UV glass 522 covers the second lens 512, and the optical axis of the second UV glass 522 coincides with the optical axis of the second lens 512.

It can be understood by a person skilled in the art that when only one lens is provided on the lens module 510, only one UV glass can be provided on the housing 520.

In an implementation, the housing 520 is spherical, and in other implementations, the housing 520 may be in any other shape, for example, in a cylindrical, ellipsoidal, or substantially spherical.

Preferably, in this embodiment, the first-axis motor assembly 340 described above is a roll-axis motor assembly of the gimbal 300, the motor in the first-axis motor assembly 340 is a roll-axis motor, and the roll-axis motor drives the lens module 510 to rotate around a roll axis 304. The roll axis 304 is a rotational center axis of the first-axis motor assembly 340, that is, the roll-axis motor assembly, in this embodiment.

Preferably, the motor in the first-axis motor assembly 340 is the motor described in Embodiment 1 of this application.

Figure 9:
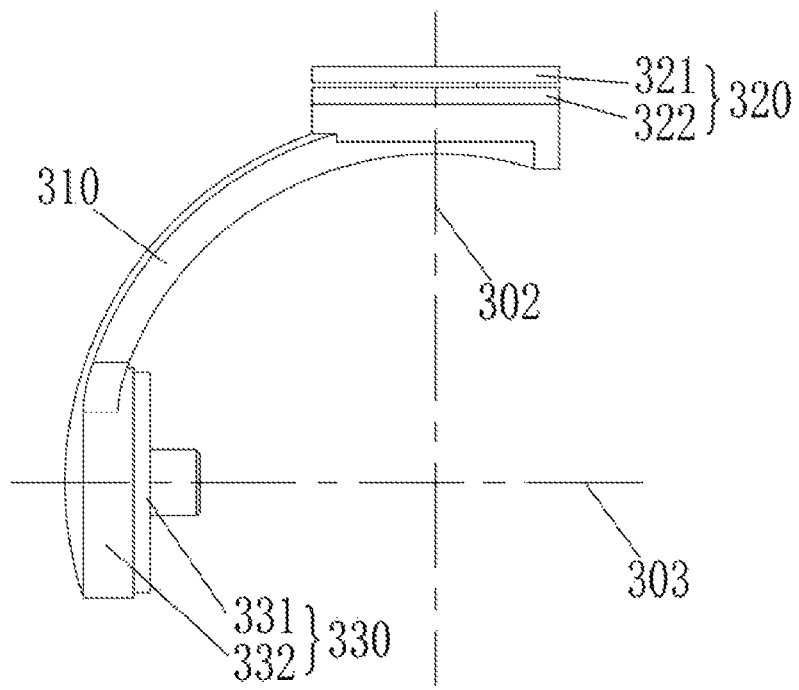
FIG. 9 is a front view mainly illustrating a support of the gimbal according to Embodiment 2 of this application.

In some implementations, as shown in FIG. 9, the gimbal 300 further includes a support 310 and a pitch-axis motor 330. The pitch-axis motor 330 is disposed at one end of the support 310. A stator 332 of the pitch-axis motor 330 is fixedly connected to the support 310, and a rotator 331 of the pitch-axis motor 330 is fixedly connected to the housing 520. The pitch-axis motor 330 is configured to drive the housing 520 and the first-axis motor assembly 340 (that is, the roll-axis motor assembly in this embodiment) and the lens module 510 that are accommodated in the housing 520 to rotate around a pitch axis 303. The pitch axis 303 is a rotational center axis of the pitch-axis motor 330.

In an implementation, the support 310 includes a cross arm and a first support arm. The cross arm of the support 310 is fixedly connected to a rotator 322 of a yaw-axis motor 320. One end of the first support arm is fixedly connected to the cross arm, and the other end of the first support arm is fixedly connected to the stator 332 of the pitch-axis motor 330. Preferably, the other end of the first support arm close to the housing 520 is fixedly connected to the stator 332 of the pitch-axis motor.

Optionally, the first support arm of the support 310 may be in a circular arc shape, or may be in another shape, for example, in an L shape.

In some implementations, the support 310 further includes a second support arm. One end of the second support arm is fixedly connected to one end of the cross arm of the support 310 away from the first support arm, and the other end of the second support arm is movably connected to the housing 520. For example, a rotational shaft is provided at the other end of the second support arm, a hole is provided on the housing 520, and the rotational shaft of the second support arm is rotatably inserted into the hole. The axial direction of the rotational shaft coincides with the rotational axial direction of the pitch-axis motor. In this case, the support 310 includes both the first support arm and the second support arm. Optionally, the second support arm and the first support arm are in a same shape. The first support arm and the second support arm form a symmetrical structure. The support 310 is preferably in a U shape. The support 310 is set to a U shape, so that when the housing 520 and the components accommodated therein rotate around the pitch axis, the rotation action can be more stable, and inclination can be avoided. In addition, deformation of the support 310 due to suspension of the gimbal for a long time is also alleviated.

In some implementations, the gimbal 300 further includes the yaw-axis motor 320. As shown in FIG. 9, the yaw-axis motor 320 is disposed at the other end of the support 310. A rotator 322 of the yaw-axis motor 320 is fixedly connected to the support 310, and a stator 321 of the yaw-axis motor 320 is fixed to an external device, for example, a vehicle body of an unmanned aerial vehicle. The yaw-axis motor 320 is configured to drive the support 310 to rotate around an yaw axis 302, and further drive the pitch-axis motor 330, the housing 520, and the first-axis motor assembly 340 (that is, the roll-axis motor assembly in this embodiment) and the lens module 510 that are accommodated in the housing 520 to rotate around the yaw axis 302 relative to the stator 321 of the yaw-axis motor 320 and the external device. The yaw axis is a rotational center axis of the yaw-axis motor 320. The roll axis 304, the pitch axis 303, and the yaw axis 302 are perpendicular to each other.

It needs to be specially noted that a rotator and a stator of a motor are both relative. That is, the rotator of the motor rotates relative to the stator. If one of the two is fixed, the other rotates, and the fixed one is referred to as the stator, and the rotating one is referred to as the rotator.

In addition, the first motor rotator 3412 and the second motor rotator 3422 may further include auxiliary inductive magnets (not shown in the figure). The auxiliary inductive magnets are annular, and are fixedly connected to the lens module 510 and sleeved over the lens module 510. Main magnetic fields of the auxiliary inductive magnets may be axial, or may be radial.

It should be understood that, in some implementations, the first-axis motor assembly 340 may include only one motor, for example, include only the first motor 341, or include only the second motor 342. Preferably, the first motor 341 or the second motor 342 is the motor described in Embodiment 1 of this application.

A connection relationship between the first-axis motor assembly 340 and the lens module 510 in this embodiment is further specifically described below.

Referring to FIG. 7 and FIG. 10, the first motor rotator 3412 and the second motor rotator 3422 are fixedly connected to the lens module 510. In some implementations, the first motor rotator 3412 and the second motor rotator 3422 may be fixedly connected to the lens module 510 by using a fastening device (for example, a screw or an adhesive). In some other implementations, the first motor rotator 3412 and the second motor rotator 3422 may also be fixedly connected to the lens module 510 by using support pieces. The support pieces are respectively placed in parallel to the first motor rotator 3412 and the second motor rotator 3422. In some implementations, the cross sections of the support pieces perpendicular to the lens module 510 may be annular. In some implementations, the support pieces having the annular sections may also not be used, and support pieces in any other shapes such as cylindrical, cubic, or striped shape may be used instead. By providing the support pieces, not only the first motor rotator 3412 and the second motor rotator 3422 can be reinforced, but also rotation of the lens module 510 driven by the first motor rotator 3412 and the second motor rotator 3422 can be more stable.

Figure 11:
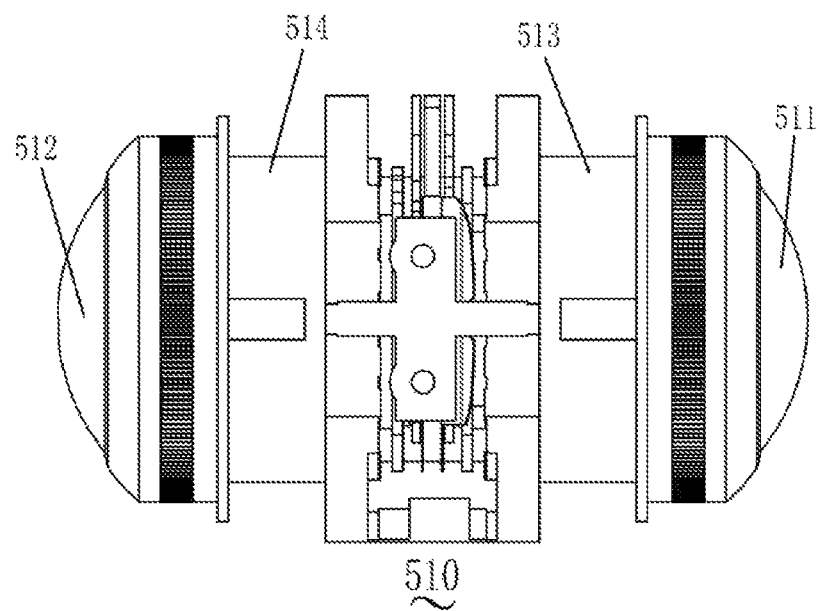
FIG. 11 is an enlarged side view of the lens module shown in FIG. 8.

The "lens module" referred to in this embodiment of this application is an imaging apparatus of the gimbal. In this embodiment, the lens module 510 includes the first lens 511 and the second lens 512. Optical axes of the first lens 511 and the second lens 512 coincide, and the orientations of the first lens 511 and the second lens 512 are opposite. The lens module 510 further includes a first lens base 513 and a second lens base 514 (FIG. 11). One end of the first lens base 513 is fixedly connected to the first lens 511, and one end of the second lens base 514 is fixedly connected to the second lens 512. In some implementations, the other end of the first lens base 513 is fixedly connected to or movably connected to the other end of the second lens base 514. In some other implementations, the first lens base 513 and the second lens base 514 are not connected to each other. When the first lens base 513 and the second lens base 514 are movably connected or not connected to each other, the first lens 511 supported and fixed by the first lens base 513 and the second lens 512 supported and fixed by the second lens base 514 may rotate relative to each other. That is, the first lens 511 and the second lens 512 may separately rotate. When the first lens base 513 and the second lens base 514 are fixedly connected, the first lens 511 and the second lens 512 are fixed together and rotate with each other.

The first motor stator 3411 and the second motor stator 3421 are separately fixedly connected to the housing 520.

In an implementation, one end of the first motor stator 3411 and one end of the second motor stator 3421 are separately fixedly connected to one side of the housing 520. Preferably, another end of the first motor stator 3411 and another end of the second motor stator 3421 are separately fixedly connected to another side of the housing 520. That is, two ends of the first motor stator 3411 and two ends of the second motor stator 3421 are respectively fixedly connected to two sides of the housing 520.

In another implementation, the entire outer edge of the first motor stator 3411 and the entire outer edge of the second motor stator 3421 are separately fixedly connected to the inner side of the housing 520.

Preferably, the first motor stator 3411 and the second motor stator 3421 may be fixedly connected to the housing 520 by using a connecting piece. Specifically, the first motor stator 3411 and the second motor stator 3421 are fixedly connected to the connecting piece, and the connecting piece is then fixedly connected to the inner side of the housing 520. In some implementations, the connecting piece and the inner wall of the housing 520 may be fixedly connected by integrated molding. In some other implementations, the connecting piece may also be fixedly connected to the inner wall of the housing 520 by using a fastening device (for example, a screw). When the entire outer edge of the first motor stator 3411 and the entire outer edge of the second motor stator 3421 are separately fixedly connected to the inner side of the housing 520, the connecting piece is preferably in an annular shape. Optionally, the first motor stator 3411 and the second motor stator 3421 may be directly fixedly connected to the inner side of the housing 520 by using a fastening device (for example, a screw and an adhesive).

In this embodiment, as shown in FIG. 10, one end of the first motor stator 3411 and one end of the second motor stator 3421 are separately fixedly connected to a first connecting piece 343, and the first connecting piece 343 is then fixedly connected to the inner side of the housing 520. During installation, the first connecting piece 343 is aligned with a through hole 523 of the housing 520. It should be noted that the first connecting piece 343 and the through hole 523 are not necessarily circular, and may have any shape.

The quantity of first connecting pieces 343 is not limited in this embodiment of this application.

In some implementations, there may be only one first connecting piece 343 connected to one end of the stator of the motor of the first-axis motor assembly 340. In this case, when the first-axis motor assembly 340 includes two motors, that is, the first motor 341 and the second motor 342, one end of the first motor stator 3411 and one end of the second motor stator 3421 are separately fixedly connected to the same first connecting piece 343. When the first-axis motor assembly 340 includes only one motor, a stator of the one motor (the first motor 341 or the second motor 342) is fixedly connected to the one first connecting piece 343.

In some other implementations, there may be two first connecting pieces 343 connected to one end of the stator of the motor of the first-axis motor assembly 340. In this case, one end of the first motor stator 3411 is fixedly connected to one of the first connecting pieces 343, and one end of the second motor stator 3421 is fixedly connected to the other first connecting piece 343.

Optionally, a second connecting piece 346 may further be included. The second connecting piece 346 is disposed opposite to the first connecting piece 343. One end of the first motor stator 3411 is fixedly connected to the first connecting piece 343, and another end is fixedly connected to the second connecting piece 346. The second motor stator 3412 is fixedly connected to the first connecting piece 343 at one end, and fixedly connected to the second connecting piece 346 at another end. By providing two connecting pieces (the first connecting piece and the second connecting piece), when the first-axis motor assembly 340 drives the lens module 510 to rotate, the first motor 341 and second motor 342 cooperate more harmoniously, and rotate more stably.

Preferably, the second connecting piece 346 is also fixedly connected to the inner side of the housing 520.

Similar to the first connecting piece 343, the quantity of second connecting pieces 346 is also not limited in this embodiment of this application.

It should be noted that a connection manner between the connecting piece (including the first connecting piece and/or the second connecting piece) and the housing 520 is not limited in this embodiment of this application. The connecting piece may be fixedly connected to the inner wall of the housing 520 by integrated molding, or may be fixedly connected thereto by using a fastening device (for example, a screw). A connection manner between the stator of the motor of the first-axis motor assembly 340 and the connecting piece is also not limited in this embodiment of this application. It may be understood that the stator of the motor of the first-axis motor assembly 340 may be fixedly connected to the connecting piece by using a fastening device (for example, a screw).

In an implementation, when the first-axis motor assembly 340 operates, the first motor 341 and the second motor 342 of the first-axis motor assembly 340 drive the first lens 511 and the second lens 512 to simultaneously rotate together. It should be understood that, in other implementations, according to a design requirement, the first motor 341 and the second motor 342 may not drive both the first lens 511 and the second lens 512 to simultaneously rotate, but the first motor 341 drives the first lens 511 and the second motor 342 drives the second lens 512 to respectively rotate at respective angular velocities and directions.

A connection relationship between the first-axis motor assembly 340 and the lens module 510 is further described below.

Figure 12:
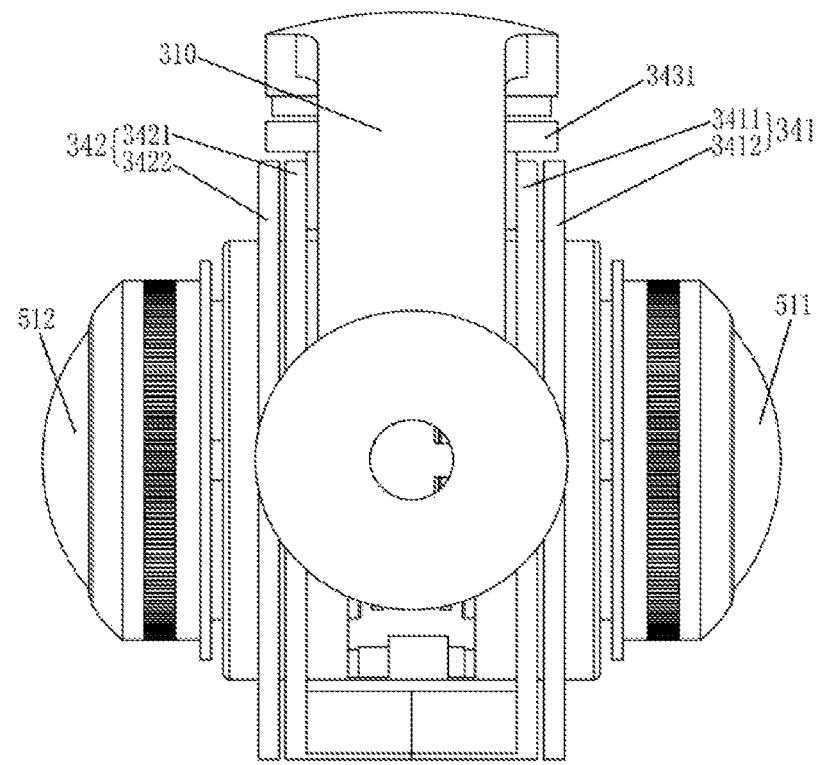
FIG. 12 is a side view of the first-axis motor assembly, the lens module, and the support of the gimbal in a combined state according to Embodiment 2 of this application.

FIG. 11 is an enlarged side view of the lens module 510 shown in FIG. 8. FIG. 12 is a side view of the first-axis motor assembly 340, the lens module 510, and the support 310 in a combined state. The first lens base 513 and the second lens base 514 are components that respectively support and fix the first lens 511 and the second lens 512.

The first motor stator 3411 is sleeved over the first lens base 513 of the lens module 510 and movably connected to the first lens base 513. Preferably, the first motor stator 3411 is movably connected to the first lens base 513 by using the first bearing 344. The first bearing 344 is embedded into the first motor stator 3411, and the first lens base 513 is embedded into the first bearing 344. The first motor rotator 3412 is fixedly connected to the first lens base 513, and sleeved over the first lens base 513. The first motor 341 is configured to drive the first lens 511 to rotate around the roll axis 304. The roll axis 304 coincides with the optical axis of the first lens 511. The process of driving the first lens 511 to rotate by the first motor 341 is: the first motor rotator 3412 drives the first lens base 513 and further drives the first lens 511 connected to the first lens base 513 to rotate relative to the first motor stator 3411.

Similarly, the second motor stator 3421 is sleeved over the second lens base 514 of the lens module 510 and movably connected to the second lens base 514. Preferably, the second motor stator 3421 is movably connected to the second lens base 514 by using the second bearing 345. The second bearing 345 is embedded into the second motor stator 3421, and the second lens base 514 is embedded into the second bearing 345. The second motor rotator 3422 is fixedly connected to the second lens base 514, and sleeved over the second lens base 514. The second motor 342 is configured to drive the second lens 512 to rotate around the roll axis 304. The roll axis 304 coincides with the optical axis of the second lens 512. The process of driving the second lens 512 to rotate by the second motor 342 is: the second motor rotator 3422 drives the second lens base 514 and further drives the second lens 512 connected to the second lens base 514 to rotate relative to the second motor stator 3421. Finally, on the whole, the first-axis motor assembly 340 is sleeved between the first lens 511 and the second lens 512, to drive the lens module 510 to rotate around the roll axis 304 relative to the housing 520.

By means of the connection in the foregoing manner, the first lens base 513 and the second lens base 514 actually not only support and fix the first lens 511 and the second lens 512, but also replace a rotational shaft of a motor in the prior art to act as rotational shafts of the first motor 341 and the second motor 342.

An important improvement of this embodiment of this application lies in sleeving a motor over the lens module 510, to replace a rotational shaft of a motor in the prior art with the lens module 510. It should be understood that there is no specific limitation to a position of the lens module in which the motor is sleeved. In this embodiment, the motor of the first-axis motor assembly 340 is sleeved over the first lens base 513 and the second lens base 514 of the lens module 510. However, in some other implementations, the first-axis motor assembly 340 is not limited to be sleeved over the lens bases, but may be sleeved over any other component of the lens module 510, for example, sleeved over the lenses of the lens module 510 or a connecting component between the lenses and the lens bases. In this case, these components not only have original functions, but also act as the rotational shaft of the motor of the first-axis motor assembly 340.

In some other implementations, the lens module 510 includes one lens, the first-axis motor assembly 340 includes one motor described in Embodiment 1, a rotator of the motor is fixedly connected to the lens module and sleeved over the lens module, and a stator of the motor is movably connected to the lens module and sleeved over the lens module. Thereby, the rotator s fixedly connected to the lens of the lens module, and drives the lens to rotate around the roll axis.

In some other implementations, the lens module 510 includes two lenses, the first-axis motor assembly 340 includes one motor described in Embodiment 1, a rotator of the motor is fixedly connected to the lens module and sleeved over the lens module, and a stator of the motor is movably connected to the lens module and sleeved over the lenses. Thereby, the rotator is fixedly connected to the two lenses of the lens module, and drives both the two lenses to rotate around the roll axis. Preferably, when optical axes of the two lenses of the lens module coincide and the two lenses are oppositely disposed, the first-axis motor assembly including the motor in Embodiment 1 may be sleeved between the two lenses, to form a structure symmetrical on the left and right sides, so that the rotator of the motor of the first-axis motor assembly drives the two lenses to rotate more stably and harmoniously.

In this embodiment, the housing 520 accommodates the lens module 510 and the first-axis motor assembly 340. Because the first motor stator 3411 and the second motor stator 3421 are sleeved over the lens module 510 and movably connected to the lens module 510, and the first motor stator 3411 and the second motor stator 3421 are fixedly connected to the housing 520 by using the first connecting piece 343, there is also a movable connection between the housing 520 and the lens module 510, and the lens module 510 can freely rotate around the roll axis relative to the housing 520. In some implementations, the first motor 341 and the second motor 342 of the first-axis motor assembly 340 are configured to drive the first lens 511 and the second lens 512 to simultaneously rotate together. However, in some other implementations, the first motor 341 and the second motor 342 of the first-axis motor assembly 340 are configured to respectively drive the first lens 511 and the second lens 512 to separately rotate in respective directions and rotational speeds. However, regardless of whether the first lens 511 and the second lens 512 rotate separately or simultaneously together, the housing 520 does not rotate. A beneficial effect brought by such a design is: when operating, the first-axis motor assembly 340 drives only the lens module 510 to rotate around the roll axis, and the housing 520 is still when viewed from the outside, which is different from a conventional gimbal. In the conventional gimbal, a motor in each axis is not sleeved over a lens module and accommodated in a housing together with the lens module, but is separate from the lens module, and is generally disposed outside the housing accommodating the lens module. Therefore, when operating, a motor in any axis of the conventional gimbal needs to drive both the lens module and the housing accommodating the lens module to rotate together as a whole, and consequently, power consumption is greater, and the size of a required motor component may also therefore be larger. However, as to the motor of this embodiment of this application, the motor needs to drive only the lens module to rotate, and also requires lower power, and therefore sizes of the components in the motor can also be designed to be smaller.

In some implementations, the optical axis of the first lens 511 and the optical axis of the second lens 512 may form a particular angle. In a preferred implementation, the first lens 511 and the second lens 512 should be such disposed that the lens module 510 can rotationally frame in 360 degrees with the yaw axis as a rotational axis. When the disposed double lenses can rotationally frame with the yaw axis as a rotational axis, the yaw-axis motor of the gimbal may be removed.

In some implementations, the lens module further includes a third lens, and the optical axis of the third lens coincides with the pitch axis. Preferably, the pitch-axis motor includes one or more motors described in Embodiment 1 of this application. Each of the one or more pitch-axis motors includes a pitch-axis motor stator and a pitch-axis motor rotator. The pitch-axis motor stator is preferably movably connected to the lens module by using a bearing and sleeved over a third lens of the lens module, or sleeved over a third lens base supporting and fixing the third lens, or sleeved over a connecting piece connecting the third lens and the third lens base. The pitch-axis motor rotator is fixedly connected to the lens module, and sleeved over the third lens of the lens module, or sleeved over third lens base supporting and fixing the third lens, or sleeved over the connecting piece connecting the third lens and the third lens base, to drive the third lens to rotate around the pitch axis. In this case, the third lens or the third lens base or the connecting piece connecting the third lens and the third lens base acts as a rotational shaft of the pitch-axis motor. In this case, similar to the foregoing case in which the motor described in Embodiment 1 is used in the roll axis of the lens module 510, when the motor described in Embodiment 1 is used in the pitch axis of the lens module 510, the lens module can freely rotate around the pitch axis relative to the housing. When operating, the pitch-axis motor drives only the lens module to rotate around the pitch axis, and the housing does not rotate when viewed from the outside. A beneficial effect brought by such a design is as follows. When operating, a motor in any axis of a conventional gimbal needs to drive both a lens module and a housing accommodating the lens module to rotate together as a whole, and consequently, power consumption is greater, and the size of a required motor component may also therefore be larger. However, different from the conventional gimbal, when the motor in Embodiment 1 is applied to the pitch-axis motor of the gimbal, because the motor needs to drive only the lens module to rotate around the pitch axis, and also requires lower power, and therefore sizes of the components in the motor can also be designed to be smaller.

In some implementations, the yaw-axis motor 320 may be omitted, and one end of the support 310 is directly fixedly connected to an external base or another external device. This is possible because the first lens 511 and the second lens 512 are respectively fixed at two ends of the first-axis motor assembly 340, and therefore angles of view of the first lens 511 and the second lens 512 are 180 degrees and opposite in direction, and the first lens 511 and the second lens 512 can photograph in a 360-degree visual range, ensuring that a 360-degree panorama image can be captured at the same time, and thereby satisfying three-dimensional experience in virtual reality. Therefore, even the yaw-axis motor 320 is omitted and the lens module 510 does not rotate around the yaw axis 302, scenes at various angles or orientations can still be captured.

In some implementations, the gimbal 300 is also suitable for being mounted or connected to a mobile object, for example, motor and non-motor vehicles or ships, an unmanned aerial vehicle, a robot, or a human or animal body. For example, the gimbal may be mounted to a vehicle body of an unmanned aerial vehicle by using a base.

Any motor component in the first-axis motor assembly 340, the pitch-axis motor 330, or the yaw-axis motor 320 may use the motor in this embodiment of this application.

The motor has the following advantages: (1) Performance is reliable, abrasion and/or a fault rate are/is reduced, and because electronic communication is employed to replace a mechanical communicator, a service life is longer than that of an existing motor. (2) A weight is small, and a size is small. (3) A structure is simplified. Therefore, a gimbal and an unmanned aerial vehicle can be miniature and light-weighted, and have low costs.

In addition, in the embodiments above, the first-axis motor assembly 340 directly drives the lens module 510 to rotate around the roll axis 304, the pitch-axis motor 330 directly drives the first-axis motor assembly 340 to rotate around the pitch axis, and the yaw-axis motor 320 directly drives the support 310, the pitch-axis motor 330, and the first-axis motor assembly 340 to rotate around the yaw axis 302. Compared with a mechanical transmission manner, the direct drive motor (for example, a compact motor or a miniature motor) provided in this embodiment of this application has at least the following advantages: (1) The direct drive motor generally requires relatively low energy (power). This can improve energy utilization and protect environment; (2) The motor can be controlled in a stepless manner, a response time can be shortened, and the motor can be adjusted in time to response to changes of different attitudes of the gimbal. Thereby, the stability of the lens module 510 can be improved.

Finally, it should be noted that, the foregoing embodiments are merely intended to describe rather than to limit the technical solutions of this application. According to the ideas of this application, the technical features in the foregoing embodiments or different embodiments may also be combined, and the steps may be performed in any order, and there exist many other variations of different aspects of this application described above, which are not provided in detail for brevity. Although this application is described in detail with reference to the foregoing embodiments, a person of ordinary skill in the art should understand that he/she may still modify the technical solutions described in the embodiments above, or make equivalent replacements for some of the technical solutions, and these modifications or replacements do not cause the essence of corresponding technical solutions to depart from the scope of the technical solutions of the embodiments of this application.

What is claimed is:

1. A gimbal, comprising:
   a lens module;
   a first-axis motor assembly driving the lens module to rotate, wherein the first-axis motor assembly comprises a motor; and
   a housing, wherein the housing accommodates the lens module and the first-axis motor assembly,
   wherein the motor in the first-axis motor assembly comprises:
   a first connection terminal, comprising a circuit board, wherein the circuit board comprises a coil circuit; and
   a second connection terminal, comprising a permanent magnet, wherein the permanent magnet is adjacent to the coil circuit, wherein there is a gap between the permanent magnet and the coil circuit, and the permanent magnet has an axial magnetization structure, wherein
   one of the first connection terminal and the second connection terminal is fixedly connected to the lens module and sleeved over the lens module, and the other of the first connection terminal and the second connection terminal is movably connected to the lens module and sleeved over the lens module.

2. The gimbal according to claim 1, wherein the motor comprises a first connection terminal and a second connection terminal, wherein one of the first connection terminal and the second connection terminal is movably connected to the lens module and is a stator of the motor, and the stator of the motor is fixedly connected to the housing.

3. The gimbal according to claim 2, wherein one end of the stator of the motor is fixedly connected to one side of the housing.

4. The gimbal according to claim 3, wherein another end of the stator of the motor is fixedly connected to another side of the housing.

5. The gimbal according to claim 2, wherein the entire outer edge of the stator of the motor is fixedly connected to the inner side of the housing.

6. The gimbal according to claim 2, wherein the stator of the motor is fixedly connected to the housing by using a connecting piece.

7. The gimbal according to claim 6, wherein when the entire outer edge of the stator of the motor is fixedly connected to the inner side of the housing, the connecting piece is in an annular shape.

8. The gimbal according to claim 1, wherein the number of the motor is one, and the lens module comprises one lens; and
a rotator of the motor is fixedly connected to the lens, and one end of the motor that is fixedly connected to the lens module is the rotator of the motor.

9. The gimbal according to claim 1, wherein the number of the motor is one, and the lens module comprises a first lens and a second lens; and
a rotator of the motor is fixedly connected to the first lens and the second lens, and one end of the motor that is fixedly connected to the lens module is the rotator of the motor.

10. The gimbal according to claim 1, wherein the motor comprises a first motor and a second motor, and the lens module comprises a first lens and a second lens;
a rotator of the first motor is fixedly connected to the first lens, a stator of the first motor is fixedly connected to the housing, and one end of the first motor that is movably connected to the first lens is the stator of the first motor; and
a rotator of the second motor is fixedly connected to the second lens, a stator of the second motor is fixedly connected to the housing, and one end of the second motor that is movably connected to the second lens is the stator of the second motor.

11. The gimbal according to claim 10, wherein one end of the stator of the first motor and one end of the stator of the second motor are fixedly connected to a same side of the housing.

12. The gimbal according to claim 11, wherein another end of the stator of the first motor and another end of the stator of the second motor are fixedly connected to another side of the housing.

13. The gimbal according to claim 11, wherein the another end of the stator of the first motor and the another end of the stator of the second motor are fixedly connected to each other.

14. The gimbal according to claim 10, wherein the entire outer edge of the stator of the first motor and the entire outer edge of the stator of the second motor are separately fixedly connected to the inner side of the housing.

15. The gimbal according to claim 10, wherein the stator of the first motor and the stator of the second motor are separately fixedly connected to the housing by using a connecting piece.

16. The gimbal according to claim 15, wherein when the entire outer edge of the stator of the first motor and the entire outer edge of the stator of the second motor are separately fixedly connected to the inner side of the housing, the connecting piece is in an annular shape.

17. The gimbal according to claim 1, wherein the housing is spherical.

18. The gimbal according to claim 1, wherein the first-axis motor assembly is a roll-axis motor assembly, the motor in the first-axis motor assembly is a roll-axis motor, and the roll-axis motor drives the lens module to rotate around a roll axis.

19. The gimbal according to claim 1, further comprising:
a support; and
a pitch-axis motor, wherein a stator of the pitch-axis motor is fixedly connected to the support, and a rotator of the pitch-axis motor is fixedly connected to the housing.

20. The gimbal according to claim 19, wherein the support comprises a cross arm and a first support arm, one end of the first support arm is fixedly connected to the cross arm, and the other end of the first support arm is fixedly connected to the stator of the pitch-axis motor.

21. The gimbal according to claim 20, wherein the support further comprises a second support arm, one end of the second support arm is fixedly connected to one end of the cross arm away from the first support arm, and the other end of the second support arm is movably connected to the housing.

22. The gimbal according to claim 1, wherein the terminal that is movably connected to the lens module of the first connection terminal and the second connection terminal is a stator of the motor, and the stator is movably connected to the lens module by using a bearing.

23. The gimbal according to claim 1, wherein the circuit board further comprises a substrate and a power circuit disposed on the substrate, wherein the power circuit is electrically connected to the coil circuit.

24. The gimbal according to claim 23, wherein the circuit board further comprises a detection circuit disposed on the substrate, wherein
the terminal that is fixedly connected to the lens module of the first connection terminal and the second connection terminal is a rotator of the motor, and the detection circuit is configured to detect a leakage magnetic field of the permanent magnet on the second connection terminal, so as to feed back positional information of the rotator.

25. The gimbal according to claim 24, wherein the circuit board further comprises a drive and control chip, wherein the drive and control chip is separately electrically connected to the power circuit and the detection circuit, and the drive and control chip is configured to control the power circuit according to the positional information of the rotator fed back by the detection circuit.

26. The gimbal according to claim 1, wherein the coil circuit comprises a single layer or multiple layers of linear circuits disposed in radial directions of the motor.

27. The gimbal according to claim 1, wherein the first connection terminal or the second connection terminal is sleeved over the lens module at any of the following positions:

a lens of the lens module, a lens base of the lens module, or a connecting component between the lens and the lens base.

28. The gimbal according to claim 1, wherein the lens module comprises at least two lenses.

\* \* \* \* \*